R. & J. E. ANDERSON.
Rice Hulling Machine.
No. 13,713.          Patented Oct. 30, 1855.
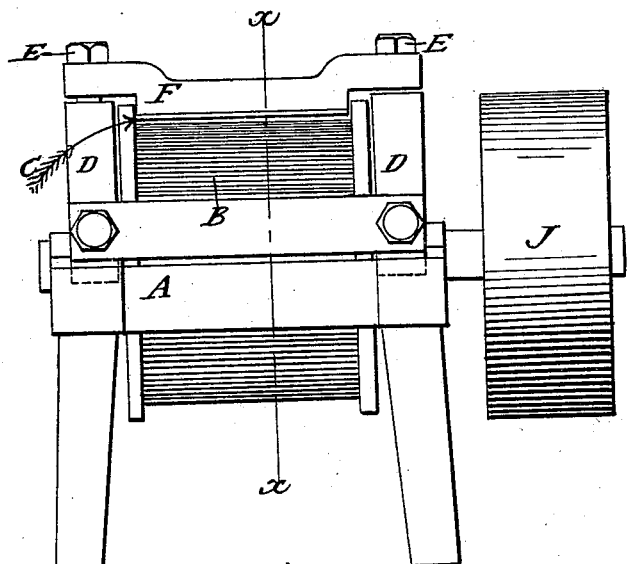
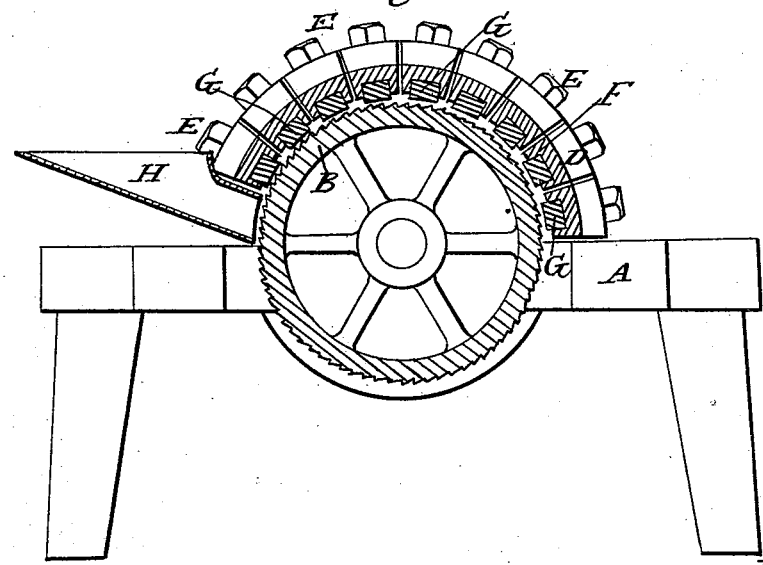

UNITED STATES PATENT OFFICE.

ROBERT ANDERSON AND JOHN E. ANDERSON, OF BROOKLYN, NEW YORK.

RICE-HULLING MACHINE.

Specification of Letters Patent No. 13,713, dated October 30, 1855.

*To all whom it may concern:*

Be it known that we, ROBERT ANDERSON, of Brooklyn, Kings county, State of New York, and JOHN E. ANDERSON, of city, county, and State aforesaid, have invented certain new and useful Improvements in Machines for Hulling Rice and other Grain; and we do hereby declare the following to be a full description of the same.

The nature of our inventions consists in the application and use of a cylinder of metal or other suitable material having its periphery fluted or cut longitudinally somewhat in the manner of a ratchet wheel, in combination with a series of adjustable ribs of metal having india rubber faces, and a suitable frame for holding the same so that, as the rice or other grain passes through the machine, the hull will be removed, and the naked kernel of grain be discharged from the end of the machine, fit for the market or use as desired.

The advantage of the use of the spiral springs with the india rubber spring face of the segments, is to gain the combined and modified effect of their joint action, and thereby we insure the desired result by causing an equal pressure of all the grain against the cylinder and at the same time provide the means of effectually wiping and cleaning it but to describe our invention more particularly we will refer to the accompanying drawings forming a part of this specification, the same letters of reference wherever they occur referring to like parts.

Figure 1, is an end elevation of the machine. Fig. 2, is a cut section of the machine through the line *x, x*, Fig. 1.

Letter A, is the frame of the machine, which is made of wood or metal as may be deemed best. Arranged transversely of the frame is a cylinder of metal B, the face or periphery of which is fluted or cut longitudinally into a series of cutting edges, somewhat in shape like a ratchet wheel. The depth of these teeth or cutting edges are to be quite shallow so as to act upon each grain as it passes through the machine to take the hull off of it. It is not absolutely necessary that these cutting edges be made parallel with the axis of the cylinder, as they may be cut spirally on the face of the cylinder and accomplish the same results, but for cheapness of making the cylinders the straight cutting edges are best, because they may be made in the ordinary cutting lathes for such purposes.

Letters D, D, are two metal supports for the rubbers. These supports are semicircular and secured by their ends to the frame of the machine at each side of the hulling cylinder. To the upper or convex side of these supports are secured by set screws E a series of rubber ribs F, made of metal or other suitable material, and of sufficient strength for the purposes required. On the under surface of these ribs are secured strips of india rubber G. These strips of rubber may be secured in any suitable way to the lower face of the ribs.

For cheapness we prefer to cut a groove in the lower face of the ribs and compress the rubber into the groove and thereby holding it without the trouble of other fastenings. The object of this rubber is to afford an elastic pressure to the rice or other grain in passing through the machine, to prevent its being broken, as would be the case if the rubber was of solid material. These rubbers may be adjusted to any required distance from the hulling cylinder by the set screws, and for convenience of lifting or elevating them from off the hulling cylinder springs may be adjusted around the set screws between the upper side of the rubber supports, and the lower side of the rubber holders or ribs so that as the set screws are drawn back, the springs lift the rubbers, and at the same time giving an elastic action to the rubbers, independent of the elastic action of the india rubber acting directly upon the face of the hulling cylinder, H and J, feed trough and pulley of machine.

Having now described our invention and its construction and operation, we will proceed to state what we claim and desire to secure by Letters Patent of the United States.

We are aware that india rubber has been applied in hulling machines and that segmental concaves supported by spiral springs are well known in this class of machines; also that it is common to apply adjusting screws to the concave when constructed in one piece; we do not claim either of these features, but What we do claim and desire to secure by Lettters Patent is—

5 The adjustable segmental concave, faced with india rubber, in combination with the spiral springs and a ratchet faced hulling cylinder in the manner described for the purpose specified.

ROBERT ANDERSON.
JOHN E. ANDERSON.

Witnesses present:
CHAS. E. FROST,
T. L. KEMPSTER.